United States Patent [19]

Leiber et al.

[11] Patent Number: 4,796,717

[45] Date of Patent: Jan. 10, 1989

[54] INSTALLATION FOR THE FORWARD DRIVE REGULATION IN MOTOR VEHICLES

[75] Inventors: Heinz Leiber, Oberriexingen; Hans Ohnemueller, Reutlingen; Klaus Kastner, Stuttgart, all of Fed. Rep. of Germany

[73] Assignee: Daimler-Benz Aktiengesellschaft, Stuttgart, Fed. Rep. of Germany

[21] Appl. No.: 136,956

[22] Filed: Dec. 23, 1987

[30] Foreign Application Priority Data

Dec. 23, 1986 [DE] Fed. Rep. of Germany ....... 3644134

[51] Int. Cl.$^4$ .............................................. B60K 31/00
[52] U.S. Cl. ................................................... 180/197
[58] Field of Search ................. 180/197; 123/351, 361; 364/426

[56] References Cited

FOREIGN PATENT DOCUMENTS

| | | |
|---|---|---|
| 3127302 | 9/1983 | Fed. Rep. of Germany . |
| 3331297 | 3/1985 | Fed. Rep. of Germany . |
| 3345730 | 6/1985 | Fed. Rep. of Germany . |
| 3603765 | 8/1986 | Fed. Rep. of Germany . |

*Primary Examiner*—John A. Pekar
*Attorney, Agent, or Firm*—Barnes & Thornburg

[57] ABSTRACT

An installation for the forward drive regulation acting on the output torque of a drive aggregate in motor vehicles with a regulating circuit responding to the slippage of each driven wheel on which is superimposed a regulating circuit responding to exceeding an acceleration threshold value of each driven wheel which replaces the slippage regulating circuit designed for optimum traction from the regulation beginning for a predetermined duration and as a result thereof rapidly stabilizes the vehicle because only a small excess torque which can be controlled in few regulating cycles, can occur owing to the early regulation beginning.

6 Claims, 2 Drawing Sheets

INSTALLATION FOR THE FORWARD DRIVE REGULATION IN MOTOR VEHICLES

BACKGROUND AND SUMMARY OF THE INVENTION

The present invention relates to an installation for the propulsion or forward drive regulation in motor vehicles in the sense of a reduction of the undesired slippage of the driven vehicle wheels. A regulating circuit is coordinated to each driven wheel and responds to the slippage of this wheel in relation to the velocity of the non-driven wheel of the same vehicle side, which when exceeding a slippage threshold value by this wheel, effects a reduction and when dropping below this slippage threshold value, effects an increase of the output torque of the drive aggregate.

Such an installation is disclosed in the DE-PS No. 31 27 302. It includes a so-called "fast" regulating circuit which acts on the brake of a driven wheel if only this wheel tends to slip. It also includes a further regulating circuit which reduces the engine torque: when both driven wheels tend to slip, when one driven wheel tends to slip above a predetermined vehicle velocity, when driving through a curve, or when the vehicle longitudinal acceleration exceeds a predetermined limit value above a velocity in the starting range.

Propulsion or forward drive regulations with braking intervention are able to avoid larger regulating deviations owing to a rapid braking intervention, however, they are very cost-intensive as regards manufacture and operating safety because an undesired braking as a result of erroneous signals can lead to extraordinarily critical driving conditions.

In particular with propulsion or forward drive regulations which act exclusively on the engine torque, the coupled rotating masses of engine and drive connection become noticeable in a disadvantageous manner and lead to noticeable overshootings of the regulation, i.e., to an excessive slippage and great acceleration of the driven wheels. They are also a reason for a non-negligible time delay between an adjustment, for example, of the throttle valve in the carburetor of the engine and the engine reaction subsequently following the same.

It is therefore an object of this invention to so improve the propulsion or forward drive regulating installation exclusively the engine torque, i.e., to make the same more rapid, so that a brake regulating circuit can be dispensed with altogether.

The underlying problems are solved according to the present invention in that a further regulating circuit is coordinated to each driven wheel, which at least in the first regulating cycle or for a predetermined duration replaces the slippage regulating circuit. The further regulating circuit is so constructed that the output torque of the drive aggregate is reduced when the acceleration of the driven wheel exceeds the acceleration of the non-driven wheel of the same vehicle side by a predetermined amount, in that the difference between the wheel circumferential velocity of the driven wheel and that of the non-driven wheel of the same side which exists at the instant of the beginning of the torque reduction, is stored and is added to the wheel circumferential velocity of the non-driven wheel whereby this addition value forms a threshold value, and in that the output torque of the driving aggregate is again increased after the wheel circumferential velocity of the driven wheel drops below this threshold value. According thereto, the slippage tendency of a driven wheel is determined when the acceleration of this wheel exceeds the acceleration of the non-driven wheel of the same vehicle side by a predetermined amount. This can be detected much earlier than exceeding a slippage threshold selected from a technical regulating point of view owing to an earlier reduction of the engine torque a much smaller excess torque is transmitted to the wheel, respectively, the wheels. Consequently, the wheel can be caught more rapidly and drops below a threshold which is formed from the velocity of the non-driven wheel and the velocity difference between the driven and non-driven wheel which exists at the instant when exceeding the acceleration threshold, in general earlier than the slippage threshold which is set much higher. In this manner, a regulation with smaller overshootings and with fewer regulating cycles can be carried out so that a regulated brake intervention can be dispensed with altogether. This is also advantageous as regards the stability of the vehicle because a smaller driving slippage also entails smaller lateral guide force losses. According to a further feature of the present invention, this acceleration regulation will be carried out only, when the vehicle longitudinal acceleration lies below a predetermined value. However, if it lies above this value, it may be assumed that a dry gripping road is being travelled over so that a normal propulsion or forward drive regulation is permissive which can handle greater slippage values and does not reduce the acceleration of the vehicle.

In contrast thereto, the "acceleration regulation" can remain engaged beyond the normally provided duration as long as the vehicle cross acceleration $b_y$ is within a predetermined range, for example, $0.05\ g < b_y < 0.15\ g$, in which a low frictional connection coefficient can be assumed. The signal representing the vehicle cross acceleration, however, can also be limited to a predetermined duration of, for example, 2 s. This suffices generally in order to stabilize the vehicle in the curve.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention and wherein.

DETAILED DESCRIPTION OF THE DRAWINGS

Figure 1:
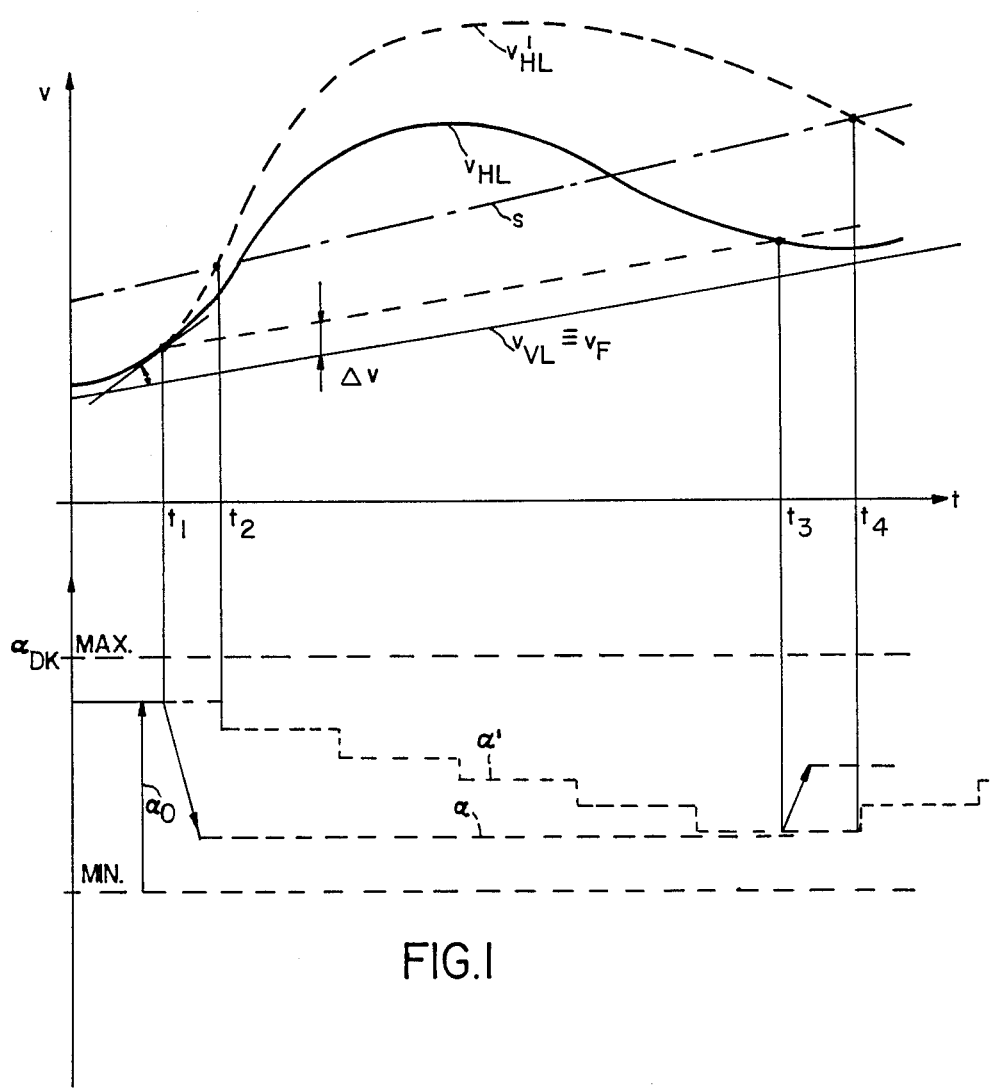
FIG. 1 is a diagram illustrating the curves of a regulating cycle.

Referring now to the drawing, FIG. 1 illustrates the courses plotted against time of a regulating cycle, i.e., the variation plotted against time of the wheel circumferential velocity of a driven wheel under consideration from the point where it exceeds a threshold value to the point where it drops below the same, respectively, up to the next time it exceeds the same or another threshold value. The curves of the velocities of a driven and of the non-driven wheel of the same vehicle side is thereby illustrated above the time axis (abscissa) and the curve plotted against time of a magnitude representing the output torque of the drive aggregate (here the throttle valve angle of a carburetor within its limit values min., max.) is illustrated below the time axis.

A vehicle with driven rear wheels is assumed for the illustrated embodiment whose regulating installation for the driven left rear wheel will be described more fully hereinafter. An identical regulating installation exists for the right rear wheel.

The straight line designated by $v_{VL}$ is the curve per unit time of the non-driven front wheel and is at the same time a reference for the vehicle velocity $v_F$. The dash line S is a curve of a slippage threshold for the left rear wheel predetermined with respect to this reference, whose wheel circumferential velocity is to follow the curve $v_{HL}$.

If one starts with a throttle valve position having the opening angle $\alpha_0$ that will provide to the left rear wheel an excessive driving torque, then this wheel begins to accelerate and exceeds at the instant of time $t_1$ an acceleration value which corresponds to the acceleration of the non-driven wheel of the same vehicle side, to which a predetermined value, for example, 0.2 g is added. In the given diagram, the angle between the straight line $v_{VL}$ and the time axis corresponds to the acceleration of the non-driven wheel while the angle between the tangent of the respectively considered point of the curve $v_{HL}$ and the straight line $v_{VL}$ corresponds to the predetermined value.

Upon exceeding this acceleration threshold value at the instant of time $t_1$, the throttle valve opening angle $\alpha$ is reduced as is indicated by a downwardly pointing arrow. The curve of this opening angle in the regulating cycle is not part of the present invention so that a possible curve (decreased to a predetermined value and subsequently kept constant) is therefore indicated by dash line $\alpha$.

For comparison purposes, a curve of the wheel circumferential velocity of the driven wheel is illustrated by the dash curve $v'_{HL}$ which will establish itself with a known slippage regulation when the driven wheel exceeds the slippage threshold at the instant $t_2$ and beginning with this instant the throttle valve angle is reduced stepwise as shown by the dash curve $\alpha'$ in the lower diagram of FIG. 1. Owing to the time delay between $t_1$ and $t_2$, the wheel will undergo a greater excess torque and therewith a greater slippage to be controlled than with the acceleration regulation illustrated in the upper part.

At the instant of exceeding the acceleration threshold value in the point of time $t_1$, the difference $\Delta v$ between the wheel circumferential velocities $v_{HL}$ of the driven wheel and $v_{VL}$ of the non-driven wheel is stored. The sum $V_{VL} + \Delta v$ forms in the following regulating cycle the threshold value with which the wheel circumferential velocity $v_{HL}$ of the driven wheel is compared. As a consequence of the reduction of the engine torque, the driven wheel is again guided toward the vehicle velocity $v_F$ and drops below the threshold value $v_{VL} + \Delta v$ at the instant of time $t_3$. Beginning with this instant of time $t_3$, the throttle valve angle can again be increased.

As a comparison with the slippage regulation shows, the wheel circumferential velocity $v'_{HL}$ will drop below the slippage threshold value S, which is considerably greater, only at the subsequent instant of time $t_4$. It can be seen therefrom that a regulation with acceleration comparison begins considerably earlier and permits only a smaller excess torque than a regulation with slippage comparison.

Figure 2:
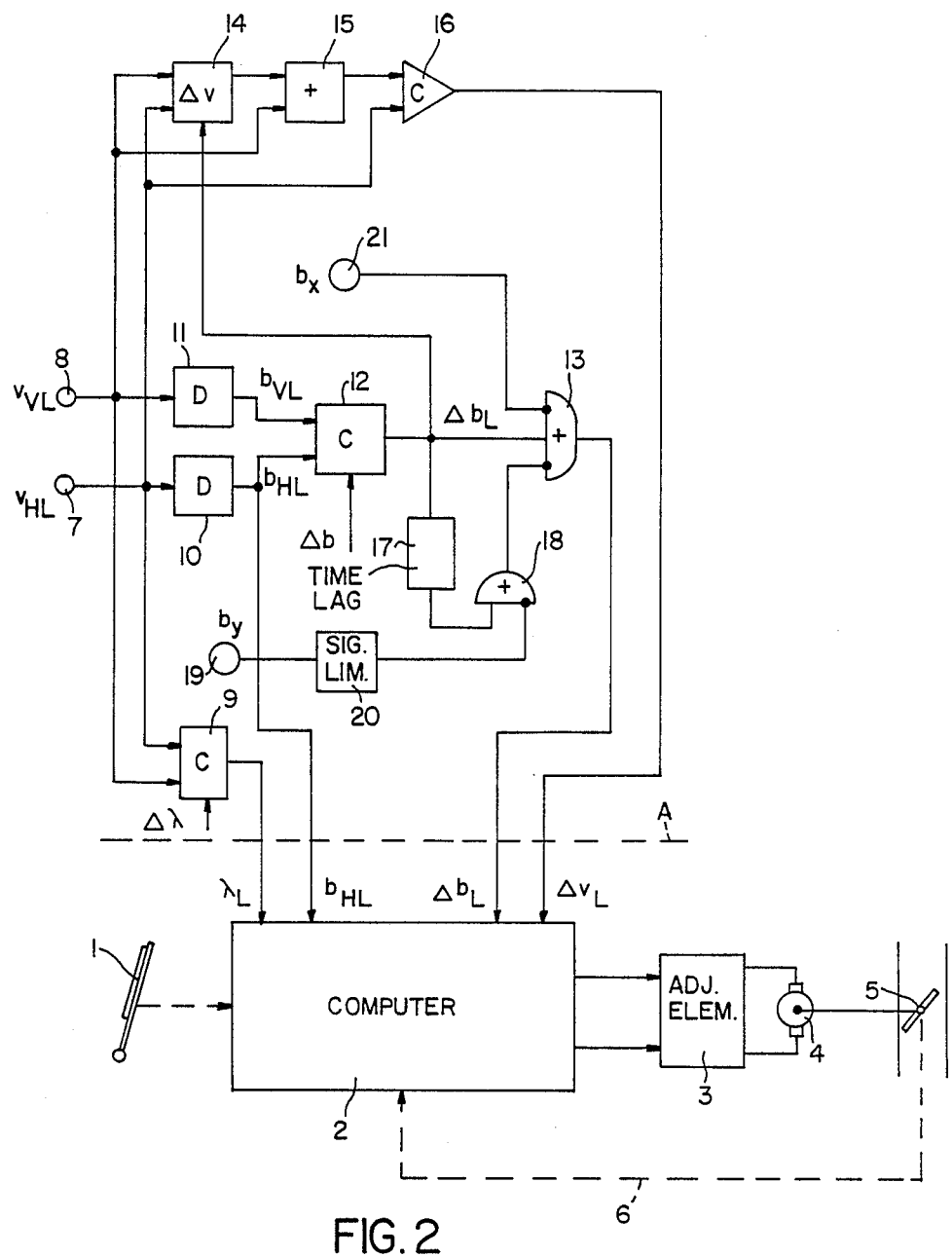
FIG. 2 is a schematic block diagram of an arrangement in accordance with the present invention.

A schematic block diagram of one possible embodiment of a propulsion or forward drive regulating installation in accordance with the present invention is illustrated in FIG. 2.

A so-called "electronic gas pedal" which is known as such, is illustrated essentially below a dash line A in FIG. 2. The electronic gas pedal consists of the components gas pedal 1, computer 2, adjusting element 3, adjusting motor 4 and symbolically represented throttle valve 5 of a carburetor with actual-value feedback 6 to the computer 2.

The propulsion or forward drive regulation of the motor vehicle (not shown) is integrated in the computer 2 as it can be realized with a microprocessor operating with a special program.

A schematic block diagram for the determination of the necessary input magnitudes for the propulsion forward drive regulation of a driven wheel, in the illustrated embodiment, for example, of the left rear wheel is illustrated above the dash line A. This part is also present for the driven wheel of the other vehicle side but is not illustrated herein for the sake of simplicity.

A rotational speed sensor 7 and 8 is coordinated to the driven wheel and the non-driven wheel of the (left) vehicle side, each of which produces analog output signals—$v_{HL}$ for the wheel circumferential velocity of the driven left rear wheel and $v_{VL}$ for the wheel circumferential velocity of the non-driven left front wheel. These analog output signals are fed to a slippage comparator 9 that produces a digital output signal $\lambda_L$ to the computer when the driven wheel exceeds a predetermined slippage $\Delta\lambda$ in relation to the non-driven wheel. This corresponds to the heretofore known slippage regulation which in the presence of the signal $\lambda_L$ throttles the engine torque either continuously or stepwise and after the disappearance of the signal also again increases the same.

The output signals $v_{HL}$ and $v_{VL}$ of the rotational speed sensors 7 and 8 are also fed to a differentiating element 10 and 11, respectively, which produces as output signal the acceleration $b_{HL}$, respectively, $b_{VL}$ coordinated to the input magnitude "velocity." The two analog acceleration signals are fed to a comparator circuit 12 which produces a digital output signal $\Delta b_L$ when the acceleration $b_{HL}$ of the driven wheel exceeds the acceleration $b_{VL}$ of the non-driven wheel by at least a predetermined value $\Delta b$. This is the case in FIG. 1 beginning from the instant of time $t_1$ (for a predetermined duration). The output signal $\Delta b_L$ is fed to the inverting input of an AND-element 13 which additionally includes two non-inverting inputs, and is fed as output signal of the AND-element 13 to the computer 2 insofar as no signal is fed to the two inverting inputs, as will be described more fully hereinafter.

The analog output signals $v_{HL}$ and $v_{VL}$ are also fed to a memory element 14 in which the difference $v_{HL} - v_{VL}$ is stored at the instant in which an output signal $\Delta b_L$ of the comparator circuit 12 appears (instant of time $t_1$ in FIG. 1). The stored difference $\Delta v$ is added in a summing element 15 to the analog output signal of the rotational speed sensor 8 corresponding to the circumferential velocity $v_{VL}$ of the non-driven wheel and the summation signal $v_{VL} + \Delta v$ is fed to a comparator 16 in which it is compared with the analog signal of the circumferential velocity $v_{HL}$ of the driven wheel. The comparator 16 produces a digital signal $\Delta v_L$ to the computer 2 when the circumferential velocity $v_{HL}$ exceeds the summation signal. This is the case in FIG. 1 beginning with the instant of time $t_l$ to the instant of time $t_3$.

In the illustrated embodiment, the regulation is to take place from the regulation beginning, i.e., from the first appearance of a signal $\Delta b_L$ of the comparator circuit 12, for a certain duration according to the acceleration criterion and subsequently according to the slippage criterion. For this purpose, the output signal $\Delta b_L$ of the comparator circuit 12 is fed to a time delay element 17 which produces for a predetermined duration beginning with the signal appearance at its input, a zero signal at its output which is fed to a non-inverting input of a second AND-element 18 whose output is operatively connected with one of the already mentioned inverting inputs of the AND-element 13. The output signal $b_y$ of a cross acceleration sensor or transmitter 19 is fed to an inverting input of the second AND-element 18, in this embodiment by way of a signal duration limiting element 20 adjusted to a predetermined duration, which appears when the transmitter 19 determines a vehicle cross acceleration within a predetermined range, for example, between 0.05 g and 0.15 g. As long as this signal appears at the inverting input of the second AND-element 18, the AND-element 13 cannot be blocked by the output signal thereof.

The output signal $b_x$ of a longitudinal acceleration transmitter 21 is fed to the second inverting input of the AND-element 13, which signal appears when the vehicle longitudinal acceleration lies above a predetermined limit value, for example, 0.2 g.

The propulsion or forward drive regulation therefore starts with the acceleration regulation after exceeding the acceleration threshold value insofar as no vehicle longitudinal acceleration greater than about 0.2 g is present (as with sufficient traction a fine-feel regulation increasing the stability is not required) and passes over to a slippage regulation after the lapse of the timing element 17 insofar as regulation deviations still exist at that time and a cross acceleration between 0.05 g and 0.15 g is not measured (which, inter alia. might be traceable back to a lower frictional connection coefficient), as a result of which the duration of the acceleration regulation would be lengthened which would benefit the vehicle stability.

The throttle valve is now regulated back (closed) by the wheel which exceeds first the threshold and is regulated up (opened) again only when also the second of the driven wheel again drops below this threshold.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the forward drive regulation in motor vehicles in the sense of a reduction of the undesired slippage of its driven vehicle wheels, comprising a first regulating circuit means coordinated to each driven wheel and responding to the slippage of a respective driven wheel in relation to the velocity of the non-driven wheel on the same vehicle side, said first regulating circuit means being operable to effect a reduction of the output torque of a drive aggregate of the motor vehicle when said wheel exceeds a slippage threshold value and for increasing the output torque of the drive aggregate when said wheel drops below the slippage threshold value, and a second regulating circuit means coordinated to each driven wheel which replaces the first-mentioned slippage regulating circuit means at least during the first regulating cycle or for a predetermined duration, said second regulating circuit means being operable to reduce the output torque of the drive aggregate when the acceleration of the driven wheel exceeds the acceleration that of the non-driven wheel of the same vehicle side by a predetermined amount and including means for storing the difference between the wheel circumferential velocity of the driven wheel and of the non-driven wheel of the same vehicle side which exists at the instant of the beginning of the torque reduction, means for adding the stored value to the wheel circumferential velocity of the non-driven wheel, whereby said summing value forms a threshold value, and said second regulating circuit means being operable to increase the output torque of the drive aggregate again after the wheel circumferential velocity of the driven wheel has dropped below said threshold value.

2. An installation according to claim 1, wherein said second regulating circuit means is operable to replace the first regulating circuit means only when the vehicle longitudinal acceleration lies below a predetermined value.

3. An installation according to claim 1, further comprising means for extending the period of engagement of the second regulating circuit means beyond the first regulating cycle or beyond the predetermined duration as long as the vehicle cross acceleration lies above a first and below a second limit value.

4. An installation according to claim 3, further comprising means for limiting a signal representing vehicle cross acceleration lying above the first and below the second limit value to a predeterminable duration.

5. An installation according to claim 3, wherein said second regulating circuit means is operable to replace the first regulating circuit means only when the vehicle longitudinal acceleration lies below a predetermined value.

6. An installation according to claim 5, further comprising means for limiting a signal representing vehicle cross acceleration lying above the first and below the second limit value to a predeterminable duration.

* * * * *